US010209378B2

United States Patent
Galford et al.

(10) Patent No.: US 10,209,378 B2
(45) Date of Patent: Feb. 19, 2019

(54) PHOTOPEAK LOCATION SYSTEMS AND METHODS

(71) Applicant: Halliburton Energy Services, Inc., Houston, TX (US)

(72) Inventors: James E. Galford, Missouri City, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/547,834

(22) PCT Filed: Mar. 26, 2015

(86) PCT No.: PCT/US2015/022721
§ 371 (c)(1),
(2) Date: Aug. 1, 2017

(87) PCT Pub. No.: WO2016/153520
PCT Pub. Date: Sep. 29, 2016

(65) Prior Publication Data
US 2018/0011221 A1    Jan. 11, 2018

(51) Int. Cl.
*G01T 1/40* (2006.01)
*G01T 7/00* (2006.01)
*E21B 47/00* (2012.01)
*E21B 49/00* (2006.01)
(Continued)

(52) U.S. Cl.
CPC .............. *G01T 7/005* (2013.01); *E21B 47/00* (2013.01); *E21B 49/00* (2013.01); *G01T 1/40* (2013.01); *G01V 5/12* (2013.01); *G01V 13/00* (2013.01)

(58) Field of Classification Search
CPC .................................. G01T 7/005; G01T 1/40
See application file for complete search history.

(56) References Cited

U.S. PATENT DOCUMENTS 5,475,727 A * 12/1995 Buchanan ................. G01T 1/40
378/53
6,403,949 B1 * 6/2002 Davis ........................ G01J 1/18
250/227.27

(Continued)

FOREIGN PATENT DOCUMENTS

WO   WO 2010/139370 A1   12/2010
WO   WO 2012/130335 A1   10/2012

OTHER PUBLICATIONS

Egger et al., "GAUSS IX: An Interactive Program for the Analysis of Gamma-Ray Spectra From GE Semiconductor Detectors," *IEEE Transactions on Nuclear Science*, vol. 42, No. 4, Aug. 1995, pp. 267-271.

(Continued)

*Primary Examiner* — Kenneth J Malkowski
(74) *Attorney, Agent, or Firm* — Haynes and Boone, LLP

(57) ABSTRACT

A laser photopeak location system comprises a gamma-ray spectrometer and a processor. The processor computes a plurality of correlation coefficients based on a comparison of a pulse-height spectrum of the gamma-ray spectrometer with an array of values. The processor locates one or more photopeaks of the pulse-height spectrum based on at least one of the plurality of correlation coefficients. Additional apparatus, methods, and systems are disclosed.

20 Claims, 5 Drawing Sheets

(51) Int. Cl.
  *G01V 5/12*      (2006.01)
  *G01V 13/00*     (2006.01)

(56) References Cited

U.S. PATENT DOCUMENTS

| | | | | |
|---|---|---|---|---|
| 7,297,957 | B1* | 11/2007 | Vickers | G01T 1/40 250/363.09 |
| 2008/0265151 | A1* | 10/2008 | Gadot | G01T 1/40 250/261 |
| 2009/0114829 | A1 | 5/2009 | He et al. | |
| 2011/0012012 | A1* | 1/2011 | Stein | G01T 1/17 250/252.1 |
| 2011/0186721 | A1 | 8/2011 | Galford | |
| 2016/0299236 | A1* | 10/2016 | Dales | G01T 1/175 |

OTHER PUBLICATIONS

International Search Report and the Written Opinion of the International Search Authority, or the Declaration, dated Nov. 30, 2015, PCT/US2015/022721, 14 pages, ISA/KR.
Knoll, Glenn F., "Radiation Detection and Measurement," *John Wiley & Sons*, Aug. 16, 2010.
Koskelo et al., "Sampo80: Minicomputer Program for Gamma Spectrum Analysis With Nuclide Identification," *Computer Physics Communications*, vol. 24, No. 1, Sep. 1, 1981, pp. 11-35.
Sanchez, Hector Jorge, "A New Peak Search Routine for Fast Evaluation on Small Computers," *Computers in Physics*, vol. 5, No. 4, Jul. 1, 1991, pp. 407-413.

\* cited by examiner

PHOTOPEAK LOCATION SYSTEMS AND METHODS

CROSS-REFERENCE TO RELATED APPLICATIONS

The present application is a U.S. National Stage patent application of International Patent Application No. PCT/US2015/022721, filed on Mar. 26, 2015, the benefit of which is claimed and the disclosure of which is incorporated herein by reference in its entirety.

BACKGROUND

Natural gamma-ray elemental concentrations in formations provide information that is useful for petrophysical evaluation purposes. For example, thorium and potassium are useful for mineral identification, especially when combined with other logging measurements. As a further example, zones with high uranium concentrations can be used to identify volcanic zones, and in many organic shale reservoirs, uranium content often correlates with total organic carbon content.

Various methods have been developed to derive these elemental concentrations from pulse-height natural gamma-ray spectra. However, deviations from measurement instrument calibration settings, including those for spectrometers, can occur for a variety of reasons. For example, voltage drifts due to changes in temperature can lead to deviations in spectrometer gain and channel offset. Similarly, light output from most scintillation crystals varies with changes in crystal temperature which, in turn, affects the gain of detector systems. In addition, aging photomultiplier cathodes can cause spectrometer gain to change over time. For some detector systems a phenomenon known as photomultiplier fatigue occurs when large counting rate changes occur over short intervals of time. In well logging, spectrometers are often operated for long periods of time, and it is not uncommon for the gain to change because of some or all of these effects.

A variety of techniques have been developed in an attempt to compensate for departures from the desired energy scale calibration of gamma-ray spectroscopy measurements. Some conventional techniques involve continuously monitoring the location of a photopeak, requiring that one or more identifiable photopeaks be present in the observed spectra. Other techniques introduce a known source of gamma rays into the detector system to be superimposed on the spectrum produced by gamma rays external to the spectrometer. However, small inaccuracies in determining the known source's location in the spectrum can lead to gain adjustments that magnify errors at larger gamma ray energies. Further, using chemical sources as a calibration reference often creates a number of safety, security, regulatory, and environmental concerns.

BRIEF DESCRIPTION OF THE DRAWINGS

The present disclosure may be better understood, and its numerous features and advantages made apparent to those of ordinary skill in the art by referencing the accompanying drawings. The use of the same reference symbols in different drawings indicates similar or identical items.

DETAILED DESCRIPTION

FIGS. 1-6 illustrate example systems and methods for locating photopeaks for calibration of a gamma-ray spectrometer. In some embodiments, a laser (e.g., a low-power semiconductor laser) is located proximate to a light guide of a down-hole gamma-ray spectrometer, so that photons from the laser can be directed to the light-sensitive elements of a photomultiplier tube of the gamma-ray spectrometer to produce reference signals. Analysis electronics analyze the reference signals relative to a spectrum to locate one or more photopeaks, and calculate and adjust for gain and channel offset. The analysis electronics may further adjust the current applied to the laser and the voltage applied to the photomultiplier tube to calibrate the gamma-ray spectrometer. In some embodiments, the analysis electronics operate to calibrate the gamma-ray spectrometer by adjusting the power supplied to the laser based on a temperature of the laser, indicated by a sensor proximate to the laser.

In some embodiments, the laser photopeak location systems and methods operate independently of a communication link with a surface data acquisition unit. In at least one embodiment, the systems and methods allow for calibration of a multi-channel pulse-height gamma-ray spectrometer for well logging instruments detecting natural gamma rays or scattered gamma rays as practiced in density logging. In some embodiments, the systems and methods are used for diagnostic measurements performed on the surface at the well site or in a laboratory. Further, in some embodiments the systems and methods are used to calibrate measured pulse-height spectra obtained from gamma-gamma reactions. The systems and methods may be used with instruments for wireline or logging while drilling (LWD) applications.

Figure 1:
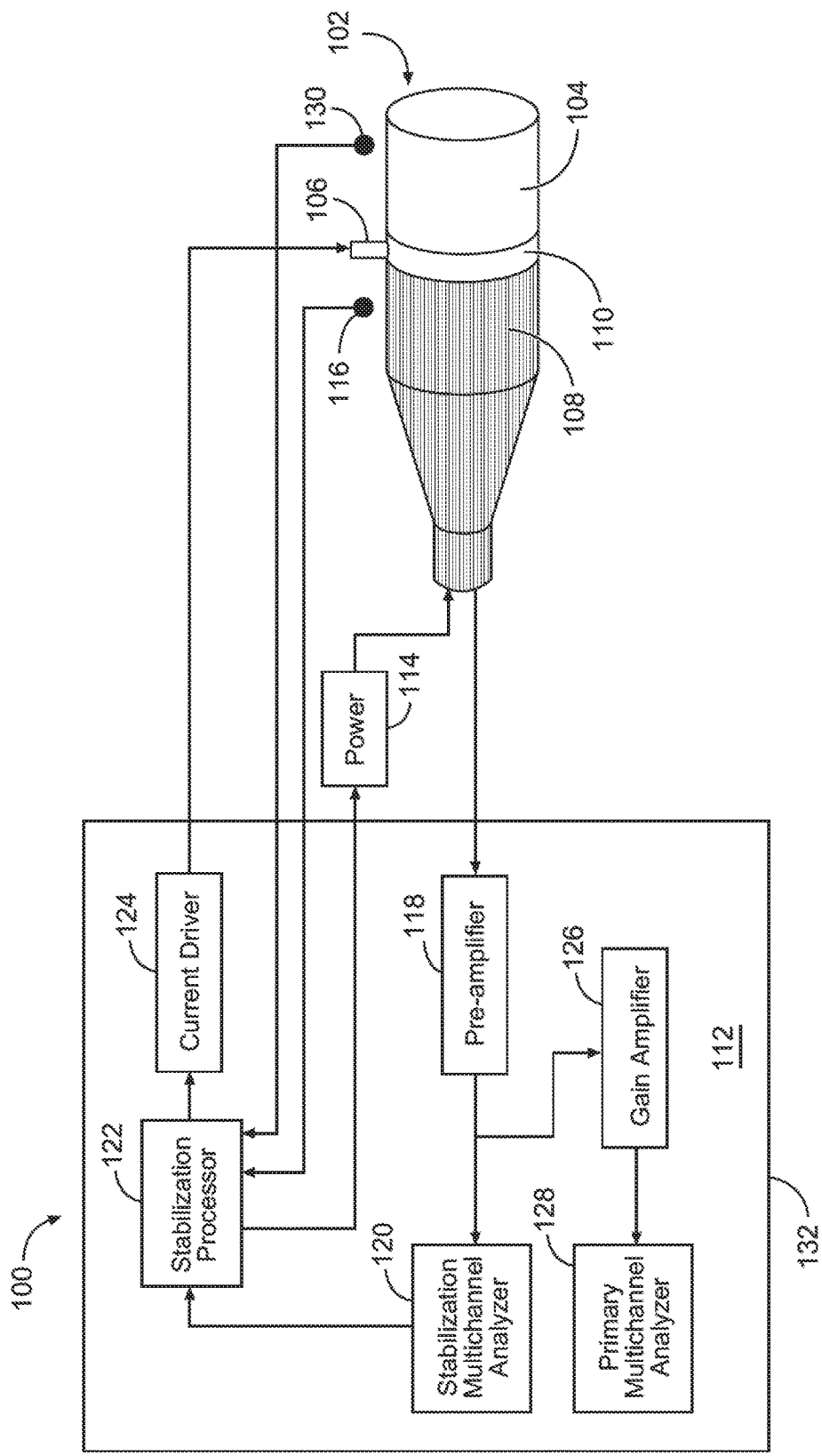
FIG. 1 depicts an example gamma-ray spectrometer calibration system, in accordance with some embodiments.

FIG. 1 depicts an example gamma-ray spectrometer calibration system 100 comprising a gamma-ray spectrometer 102 that is to measure gamma-ray energy, in accordance with some embodiments. The gamma-ray spectrometer calibration system 100 utilizes one or more photopeak location methods to calibrate the gamma-ray spectrometer 102. The gamma-ray spectrometer calibration system 100 comprises a scintillation crystal 104, a laser 106, a photomultiplier tube 108, a light guide 110, analysis electronics 112, a power supply 114, and one or more temperature sensors 116, 130. While the illustrated embodiments are described with reference to a laser as a matter of convenience, in other embodiments, the laser 106 may comprise any artificial light source. The scintillation crystal 104 is optically coupled to the photomultiplier tube 108 via the light guide 110. The light guide 110 provides an optical connection through which photons arising from radiation interactions in the scintillation crystal 104 can be sensed by the light-sensitive photomultiplier tube 108. The laser 106 is located proximate to the light guide 110 such that photons from the laser 106 can also be directed to the light-sensitive elements of the photomultiplier tube 108. That is, the laser 106 is optically coupled to the photomultiplier tube 108. In at least one embodiment, the laser 106 is a semiconductor laser, for example a low-power semiconductor laser.

For example, in some embodiments, the laser 106 may comprise one or more low-power class II or class IIIA semiconductor lasers. Laser 106 may be selected based on any of a number of criteria. For example, the wavelength of the light output of the laser 106 should be chosen to match the sensitivity of the photomultiplier tube 108. For example, in at least one embodiment, the laser 106 operates in the 300-700 nanometer range, such as GaN UV (370 nm) or InxGaxN (400-480 nm) blue semiconductor lasers.

Different configurations of the light guide 110 are provided in some embodiments. For example, in at least one embodiment the laser 106 may be embedded within the light guide 110 coupling the scintillation crystal 104 to the photomultiplier tube 108. In some embodiments, the light guide 110 comprises fiber optical light guides embedded in the coupling between the scintillation crystal 104 and the photomultiplier tube 108, such that light from the laser 106 is directed to the light-sensitive components of the photomultiplier tube 108 through the fiber optical light guides.

The laser 106 pulses or otherwise emits light toward the light guide 110 of the gamma-ray spectrometer 102 to induce one or more reference signals, which create one or more photopeaks. The photomultiplier tube 108 provides the one or more reference signals for the analysis electronics 112 to analyze relative to a spectrum. The analysis electronics 112 operate to calibrate the gamma-ray spectrometer 102 based on the analysis of the reference signals. For example, in at least one embodiment, the analysis electronics 112 operate to calibrate the gamma-ray spectrometer 102 to compensate for changes in gain, changes in offset, or both changes in gain and changes in offset. In at least one embodiment, the analysis electronics 112 operate to calibrate the gamma-ray spectrometer 102 by determining initial settings (for example, start-up settings for the gamma-ray spectrometer 102), updated settings, or a combination of initial settings and updated settings. In some embodiments, the analysis electronics 112 operate to calibrate the gamma-ray spectrometer 102 responsive to a signal provided by the temperature sensor 116 indicating a temperature proximate to the laser 106, or the temperature sensor 130 indicating a temperature proximate to the scintillation crystal 104, or both. In at least one embodiment, the analysis electronics 112 operate to calibrate the gamma-ray spectrometer 102 by adjusting power supplied to the laser 106. In some embodiments, the analysis electronics 112 operate to calibrate the gamma-ray spectrometer by adjusting the power supplied to the photomultiplier tube 108 by the power supply 114. The power supply 114 may further supply power to any one or more of the components of the gamma-ray spectrometer calibration system 100.

In at least one embodiment, the analysis electronics 112 comprise a preamplifier 118. The preamplifier 118 processes the signal produced by the photomultiplier tube 108 for processing by a stabilization multichannel analyzer 120. The stabilization multichannel analyzer 120, of the analysis electronics 112, generates a spectrum or spectra based on one or more signals produced by the photomultiplier tube 108 as a result of radiation interactions in the scintillation crystal 104.

The analysis electronics 112 may further comprise a stabilization processor 122. The stabilization processor 122 receives the accumulated spectra and the reference signals from the stabilization multichannel analyzer 120 and analyzes the reference signals relative to the one or more spectra. For example, in at least one embodiment, the stabilization processor 122 identifies the location of reference peaks generated by the reference signals to determine gain and channel offset. In some embodiments, the stabilization processor 122 computes a plurality of correlation coefficients based on a comparison of a pulse-height spectrum of the gamma-ray spectrometer 102 with an array of values, for example, an array of Gaussian functions. In some embodiments, the stabilization processor 122 locates one or more photopeaks of the pulse-height spectrum based on at least one of the plurality of correlation coefficients. In some embodiments, the stabilization processor 122 accesses instructions which, when executed, operate to locate the one or more photopeaks using polynomial functions. For example, in at least one embodiment, the executed instructions result in performing a quadratic interpolation using one or more of the plurality of correlation coefficients.

The stabilization processor 122 controls generation of light pulses from the laser 106 via a current driver 124. In at least one embodiment, the stabilization processor 122 receives a signal from one or more of the temperature sensors 116, 130 and adjusts the generation of light pulses from the laser 106 via the current driver 124 based on the signal from one or more of the temperature sensors 116, 130. In some embodiments, the stabilization processor 122 adjusts the power supplied to the photomultiplier 108 via the power supply 114. For example, calibration of the gamma-ray spectrometer 102 may comprise adjusting a voltage provided by the power supply 114 to the photomultiplier tube 108. For example, in at least one embodiment, the stabilization processor 118 adjusts the voltage setting according to a function of the observed locations of the reference photopeaks (produced by the photomultiplier tube 108 in response to the light pulses from the laser 106) in the accumulated spectra.

Maintaining calibration under varying operating conditions in some embodiments comprises a closed control loop that includes the stabilization multichannel analyzer 120 (e.g., a stabilization multichannel pulse-height analyzer), the stabilization processor 122, the current driver 124, and the temperature sensors 116, 130. In some embodiments, the closed control loop further comprises the preamplifier 118, such that output pulses from the photomultiplier tube 108 may be directed through the preamplifier 118 to the stabilization multichannel analyzer 120. In at least one embodiment, signals from the preamplifier 118 are passed through a gain amplifier 126 and a primary multichannel analyzer 128. Because the reference photopeaks produce signals that are above the energy range of interest for detected gamma rays, in at least one embodiment, pulse-height spectra for the intended measurement is recorded on an expanded energy scale relative to the stabilization pulse-height spectra. The gain amplifier 126 applies additional gain amplification to the output pulses from the pre-amplifier 118 before they are passed to the primary multichannel analyzer 128. In at least one embodiment, the reference photopeaks are created by pulsing the laser 106 such that its output light intensity exceeds the output light intensity produced in the scintillation crystal 102 by interactions arising from the largest energy gamma rays of interest. In such a configuration, the signals from the reference photopeaks may exceed the range of the primary multichannel analyzer 128 and would therefore not be counted.

In the illustrated embodiment, the analysis electronics 112 comprise a housing 132 to house one or more components of the analysis electronics 112. For example, in some embodiments, the housing 132 protects the analysis electronics 112 from a downhole environment. In at least one embodiment, the photopeak location and gamma-ray spectrometer calibration are performed downhole, at the analysis electronics 112, independently of a communication link with a surface data acquisition unit. In some embodiments, the housing 132 is attached to one or more components of the analysis electronics 112.

Figure 2:
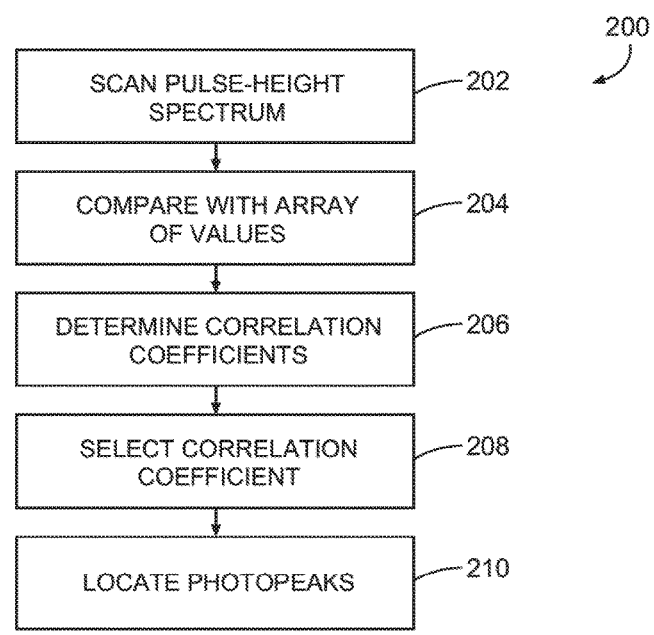
FIG. 2 is a flow diagram of an example method of locating laser photopeaks, in accordance with some embodiments.

FIG. 2 is a flow diagram of an example method 200 of locating laser photopeaks, in accordance with some embodiments. As a matter of convenience, the method 200 is described with reference to the gamma-ray spectrometer calibration system 100 of FIG. 1. At block 202, the analysis electronics 112 scan one or more channels of a pulse-height spectrum within a correlation window. For example, in at least one embodiment, the analysis electronics 112 scan channel regions in the pulse-height spectrum that bracket anticipated positions of one or more laser photopeaks.

At block 204, the analysis electronics 112 compare the pulse-height spectrum with an array of values. In some embodiments, the array of values comprises an array of values indicative of a peak-shape function. For example, in some embodiments, the array of values comprises an array of Gaussian function evaluations that span a plurality of pulse-height channels. In at least one embodiment, the array of values comprises an odd number of values. In some embodiments, the array of values comprises a substantially symmetrical distribution of values about a maximum amplitude value as a central value. In at least one embodiment, the array of values comprises 13 values. In at least one embodiment, each value of the array of values is dependent on the pulse rate of the laser 106.

At block 206, the analysis electronics 112 determine a plurality of correlation coefficients based on the comparison of the pulse-height spectrum and the array of values. In some embodiments, the analysis electronics 112 perform a correlation evaluation of the pulse-height spectrum generated by the gamma-ray spectrometer 102 to produce the plurality of correlation coefficients. For example, in some embodiments, the analysis electronics 112 evaluate a correlation function for each channel in the correlation window. In at least one embodiment, the analysis electronics 112 evaluate the correlation function using an element from the array of values.

At block 208, the analysis electronics 112 select a selected correlation coefficient of the plurality of correlation coefficients. In some embodiments, the analysis electronics 112 maintain a table (or otherwise collect) of correlation coefficients together with an identity of the channel where a maximum correlation coefficient occurs. In at least one embodiment, the analysis electronics 112 select a correlation coefficient comprising the greatest value of the plurality of correlation coefficients as the selected correlation coefficient.

At block 210, the analysis electronics 112 locate at least one photopeak in an energy spectrum measured by the gamma-ray spectrometer 102 based one or more of the plurality of correlation coefficients. In some embodiments, the analysis electronics 112 locate the at least one photopeak based on the selected correlation coefficient. In at least one embodiment, the analysis electronics 112 locate the center of the laser photopeak with fractional-channel accuracy. In some embodiments, the analysis electronics 112 identify a channel associated with the selected correlation coefficient as a photopeak location. In some embodiments, the analysis electronics 112 perform a quadratic interpolation to locate at least one photopeak. For example, in at least one embodiment, the analysis electronics 112 perform a three-point quadratic interpolation using adjacent integral channel correlation coefficients. While the illustrated embodiments are described with reference to a laser photopeak, the photopeak location methods and systems described herein could be used to locate reference photopeaks for any artificial light source that is part of, or used in conjunction with, a gamma-ray spectrometer. In at least one embodiment, the method 200 is performed independently of a communication link with a surface data acquisition unit. For example, in some embodiments, the analysis electronics 112 perform the entire method 200 downhole, such that the housing 132 protects the analysis electronics 112 from the downhole environment.

Figure 3:
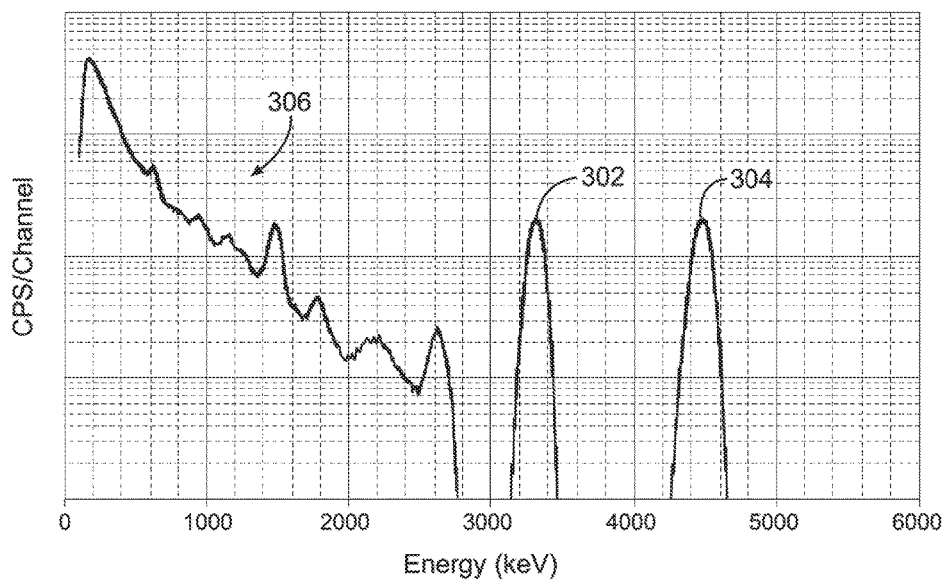
FIG. 3 is an example of a pulse-height spectrum indicating reference signals produced by a gamma-ray spectrometer calibration system, in accordance with some embodiments.

FIG. 3 is an example of a pulse-height spectrum indicating reference signals produced by a gamma-ray spectrometer calibration system (such as the gamma-ray spectrometer calibration system 100 of FIG. 1), in accordance with some embodiments. The gamma-ray spectrometer calibration system 100 generates reference signals via pulsing of the laser 106, such that the corresponding reference photopeaks 302, 304 do not interfere with the spectra of detected gamma rays 306. The analysis electronics 112 control the output light intensity of the laser 106 via the current driver 124, such that the light intensity associated with the reference photopeaks 302, 304 exceeds the expected energy domain of detected gamma rays 306. Conventional sources of reference signals result in down-scattered gamma rays, creating a background that interferes with the desired measured spectra. In contrast, the light pulses of the laser 106 create the reference photopeaks 302, 304 without contributing to the down-scattered background.

In at least one embodiment, since the reference photopeaks 302, 304 produce signals that are above the energy range of interest for detected gamma rays, the analysis electronics 112 record pulse-height spectra for the intended measurement on an expanded energy scale relative to the spectra recorded by the stabilization multichannel analyzer 120 and processed by the stabilization processor 122. Thus, in some embodiments, additional gain amplification may be applied (via the gain amplifier 126) to the output pulses from the pre-amplifier 118 before they are passed to the primary multichannel analyzer 128. In such a configuration, the signals from the reference photopeaks 302, 304 may exceed the range of the primary multichannel analyzer 128 and they would therefore not be counted. In at least one embodiment, two reference photopeaks 302, 304 are produced such that a complete, dynamic calibration of the gamma-ray spectrometer 102, i.e., gain and channel offset, is achieved through a feedback connection between the stabilization processor 122 and the stabilization multichannel analyzer 120.

Figure 4:
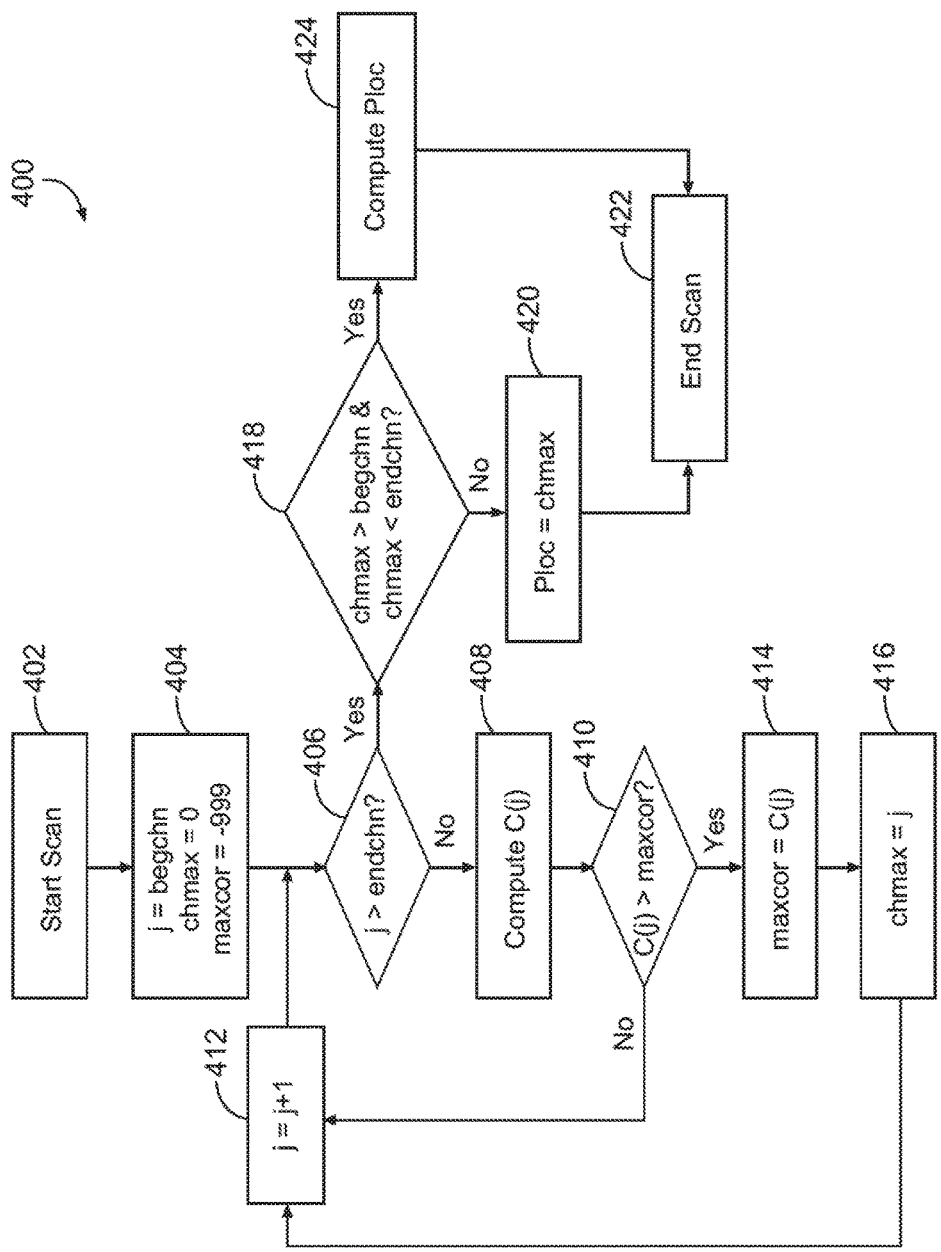
FIG. 4 is a flow diagram of an example method of locating laser photopeaks, in accordance with some embodiments.

FIG. 4 is a flow diagram of an example method 400 of locating laser photopeaks, in accordance with some embodiments. As a matter of convenience, the method 400 is described with reference to the gamma-ray spectrometer calibration system 100 of FIG. 1. In at least one embodiment, the method 400 comprises a set of instructions which, when executed by the stabilization processor 122, operate to locate one or more photopeaks. While described with reference to laser photopeaks, the method 400 may be used to locate other types of reference photopeaks, for example, photopeaks from any artificial light source.

At block 402, the analysis electronics 112 initiate a scan through the correlation window beginning with channel begchn and ending at channel endchn. At block 404, the analysis electronics 112 begin the scan by initializing variables that keep track of the channel being scanned, j, the channel containing the maximum correlation coefficient, chmax, and the maximum value of the correlation coefficient, maxcor.

At block 406, the analysis electronics 112 determine whether the end of the correlation window has been reached by analyzing whether the channel being scanned, j, is greater than the ending channel, endchn. If the end of the correlation window has not been reached, the method 400 proceeds to block 408, where the analysis electronics 112 calculate a correlation coefficient C(j). In at least one embodiment, the analysis electronics 112 store the correlation coefficient C(j) values in an array. In at least one embodiment, the correlation function is evaluated for each channel, j, in the correlation window according to:

$$c(j) = \sum_{i=j-6}^{j+6} n_i G(i-j+7) \tag{1}$$

where i is a spectrum channel in the correlation length, $n_i$ is the counts in spectrum channel i, and G(i−j+7) is an element from the array of Gaussian function values. The array of Gaussian values is defined from the relationship:

$$G(k) = Ae^{\left(-\frac{1}{2}\left(\frac{k-7}{\sigma}\right)^2\right)} \tag{2}$$

where k is the array index (e.g., from 1 to 13), σ is the standard deviation, and A is the expected amplitude of the laser photopeak. In at least one embodiment, A depends on the chosen laser pulsing rate. In at least one embodiment, the laser pulsing rate is a few counts per second, for example 10-25 counts per second. In some embodiments, σ comprises a few channels, for example, less than five. In at least one embodiment, σ depends on the application, for example, natural gamma rays versus density logging, etc. In at least one embodiment, σ is consistent with inherent broadening of discreet pulse-height signals that occurs as a consequence of the photoelectron multiplication in the photomultiplier tube 108. In at least one embodiment, σ correlates with the performance of the photomultiplier tube 108 and parameters for the laser 106.

At block 410, the analysis electronics 112 operate to compare the calculated correlation coefficient C(j) with a previous maximum correlation coefficient value, maxcor. The maximum correlation coefficient value, maxcor, is the greatest correlation coefficient value calculated in a given scan. If the calculated correlation coefficient C(j) is not greater than the maximum correlation coefficient value, maxcor, the method 400 proceeds to block 412, where the analysis electronics 112 advance the scan to the next channel in the correlation window.

If, at block 410, the calculated correlation coefficient C(j) is greater than the maximum correlation coefficient value, maxcor, then the method 400 proceeds to block 414, where the analysis electronics 112 set the correlation coefficient value C(j) as the new maximum correlation coefficient value, maxcor. At block 416, the analysis electronics 112 set the channel containing the maximum correlation coefficient, chmax, as the current channel being scanned, j, associated with the new maximum correlation coefficient value, maxcor. The method 400 then returns to block 412, wherein the analysis electronics 112 advance the scan to the next channel in the correlation window.

If, at block 406, the analysis electronics 112 determine that the current channel, j, is greater than the ending channel of the correlation window, endchn, the scan has reached the end of the correlation window. At block 418, the analysis electronics 112 compare the channel where the largest correlation coefficient (i.e., the maximum correlation coefficient, maxcor) occurred, chmax, to the beginning channel, begchn, and the ending channel, endchn, of the correlation window. That is, the analysis electronics 112 determine whether the largest correlation coefficient, maxcor, occurred at either end of the correlation window (begchn or endchn). If the analysis electronics 112 determine that the channel associated with the maximum correlation coefficient value, chmax, is equal to the beginning channel, begchn, or the ending channel, endchn, of the correlation window, at block 420, the analysis electronics 112 set the peak location, Ploc, to that channel, chmax. The method 400 then proceeds to block 422, where the analysis electronics 112 end the scan.

If, at block 418, the analysis electronics 112 determine that the channel associated with the largest correlation coefficient, chmax, did not occur at either the beginning channel, begchn, or the ending channel, endchn, of the correlation window, then the channel associated with the largest correlation coefficient, chmax, is an intermediate channel. At block 424, the analysis electronics 112 determines the location of the photopeak, Ploc, by performing a quadratic interpolation. For example, in at least one embodiment, the analysis electronics 112 perform a three-point quadratic interpolation using adjacent integral channel correlation coefficients:

$$y_1 = ax_1^2 + bx_1 + c$$

$$y_2 = ax_2^2 + bx_2 + c$$

$$y_3 = ax_3^2 + bx_3 + c \tag{3}$$

where the x and y values are channel numbers and correlation coefficients, respectively, from the correlogram that straddles the maximum correlation coefficient. In at least one embodiment, the analysis electronics 112 determine coefficients a, b, and c by applying Cramer's rule. In some embodiments, the analysis electronics 112 perform the quadratic interpolation to identify an x value that yields a zero for the first derivative. In at least one embodiment, the analysis electronics 112 determine only coefficients a and b, because coefficient c is not retained in the first derivative. Thus, the photopeak center $x_c$ is found by evaluating $$x_c = -\frac{b}{2a} \tag{4}$$

where:

$$a = \frac{(y_2 - y_1)(x_1 - x_3) + (y_3 - y_1)(x_2 - x_1)}{(x_1 - x_3)(x_2^2 - x_1^2) + (x_2 - x_1)(x_3^2 - x_1^2)} \tag{5}$$

and:

$$b = \frac{y_2 - y_1 - a(x_2^2 - x_1^2)}{x_2 - x_1} \tag{6}$$

After the analysis electronics 112 calculate the peak location, Ploc, at block 424, the method 400 proceeds to block 422, where the analysis electronics end the scan. In at least one embodiment, the analysis electronics 112 use the one or more peak locations, Ploc, to calibrate the gamma-ray spectrometer 102.

Figure 5:
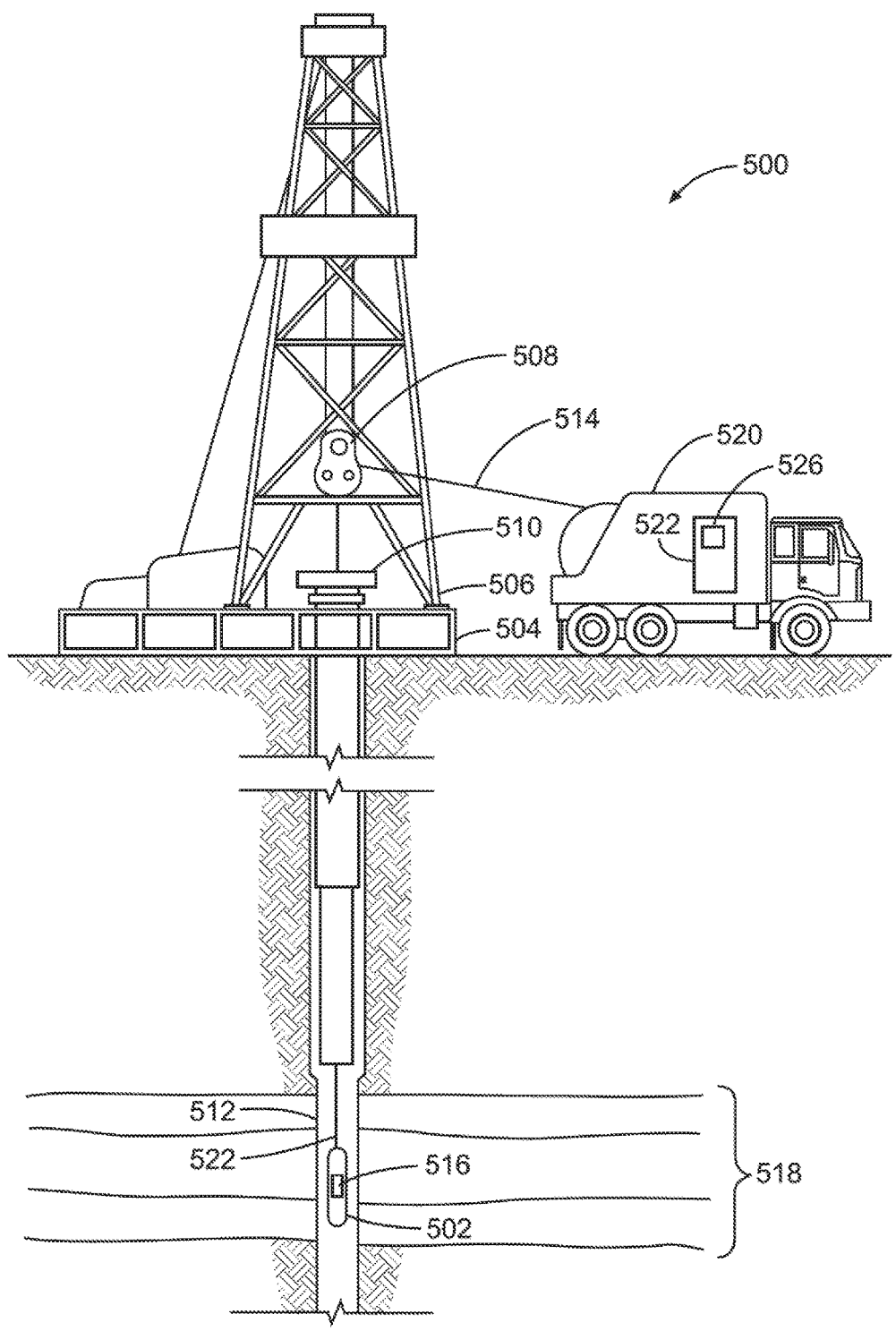
FIG. 5 depicts an example system at a wireline site, in accordance with some embodiments.
Figure 6:
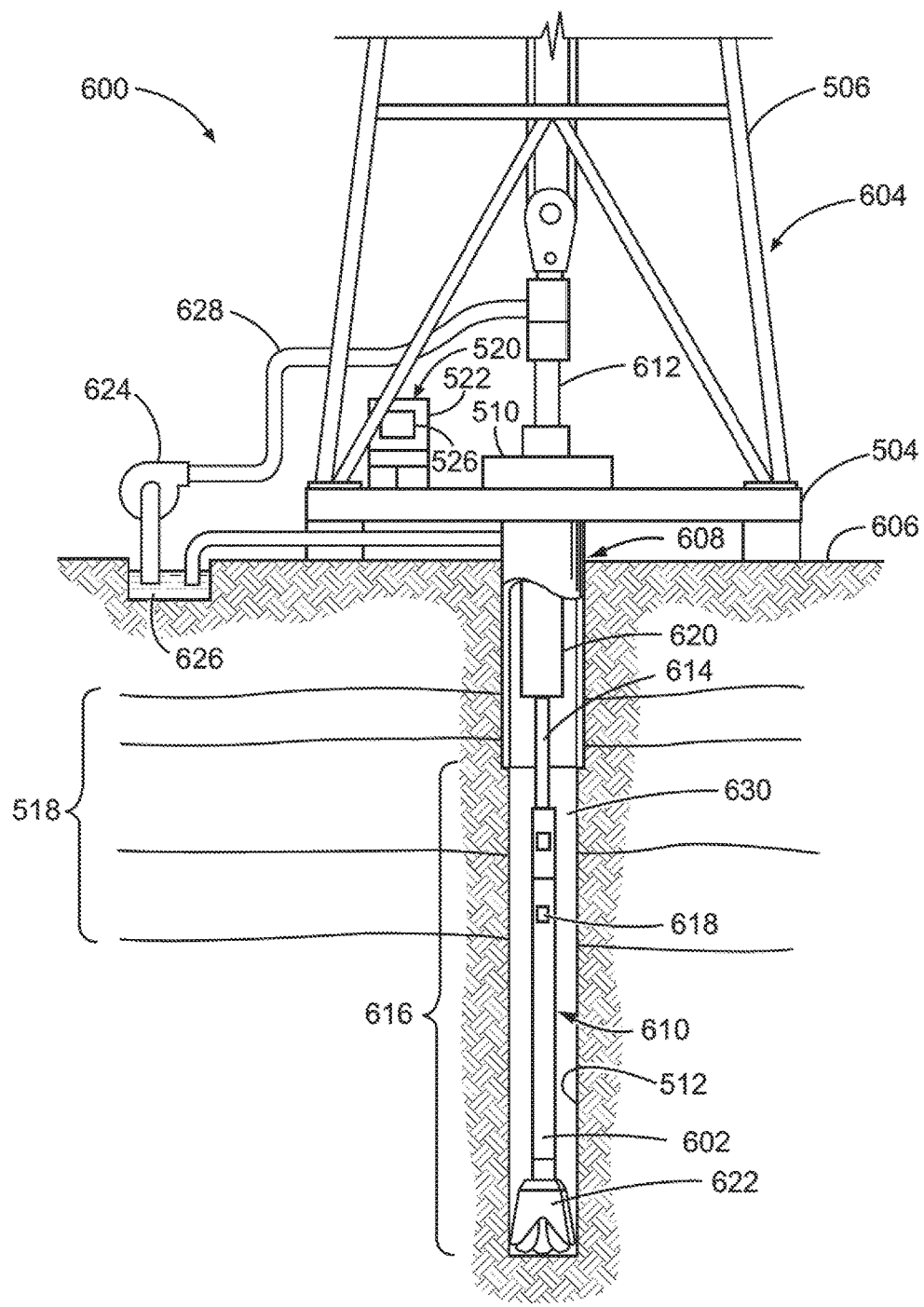
FIG. 6 depicts an example system at a drilling site, in accordance with some embodiments.

FIG. 5 is a diagram showing a wireline system 500 embodiment, and FIG. 6 is a diagram showing a logging while drilling (LWD) system 600 embodiment. The systems 500, 600 may thus comprise portions of a wireline logging tool body 502 as part of a wireline logging operation, or of a down hole tool 602 as part of a down hole drilling operation.

FIG. 5 illustrates a well used during wireline logging operations. In this case, a drilling platform 504 is equipped with a derrick 506 that supports a hoist 508. Drilling oil and gas wells is commonly carried out using a string of drill pipes connected together so as to form a drillstring that is lowered through a rotary table 510 into a wellbore or borehole 512. Here it is assumed that the drillstring has been temporarily removed from the borehole 512 to allow a wireline logging tool body 502, such as a probe or sonde, to be lowered by wireline or logging cable 514 (e.g., slickline cable) into the borehole 512. Typically, the wireline logging tool body 502 is lowered to the bottom of the region of interest and subsequently pulled upward at a substantially constant speed. The tool body 502 may include gamma-ray spectrometer calibration system 516 (which may include any one or more of the elements of system 100 in FIG. 1).

During the upward trip, at a series of depths various instruments (e.g., the gamma-ray spectrometer calibration system 516 included in the tool body 502) may be used to perform measurements on the subsurface geological formations 518 adjacent to the borehole 512 (and the tool body 502). The measurement data can be communicated to a surface logging facility 520 for processing, analysis, and/or storage. The processing and analysis may include natural gamma-ray spectroscopy measurements and/or determination of formation density. The logging facility 520 may be provided with electronic equipment for various types of signal processing, which may be used by any one or more of the components of the gamma-ray spectrometer calibration system 516. Similar formation evaluation data may be gathered and analyzed during drilling operations (e.g., during LWD/MWD (measurement while drilling) operations, and by extension, sampling while drilling).

In some embodiments, the tool body 502 is suspended in the wellbore by a wireline cable 514 that connects the tool to a surface control unit (e.g., comprising a workstation 522). The tool may be deployed in the borehole 512 on coiled tubing, jointed drill pipe, hard wired drill pipe, or any other suitable deployment technique.

Referring to FIG. 6, it can be seen how a system 600 may also form a portion of a drilling rig 604 located at the surface 606 of a well 608. The drilling rig 604 may provide support for a drillstring 610. The drillstring 610 may operate to penetrate the rotary table 510 for drilling the borehole 512 through the subsurface formations 518. The drillstring 610 may include a Kelly 612, drill pipe 614, and a bottom hole assembly 616, perhaps located at the lower portion of the drill pipe 614. As can be seen in the figure, the drillstring 610 may include a gamma-ray spectrometer calibration system 618 (which may include any one or more of the elements of system 100 in FIG. 1).

The bottom hole assembly 616 may include drill collars 620, a down hole tool 602, and a drill bit 622. The drill bit 622 may operate to create the borehole 512 by penetrating the surface 606 and the subsurface formations 518. The down hole tool 602 may comprise any of a number of different types of tools including MWD tools, LWD tools, and others.

During drilling operations, the drillstring 610 (perhaps including the Kelly 612, the drill pipe 614, and the bottom hole assembly 616) may be rotated by the rotary table 510. Although not shown, in addition to, or alternatively, the bottom hole assembly 616 may also be rotated by a motor (e.g., a mud motor) that is located down hole. The drill collars 620 may be used to add weight to the drill bit 622. The drill collars 620 may also operate to stiffen the bottom hole assembly 616, allowing the bottom hole assembly 616 to transfer the added weight to the drill bit 622, and in turn, to assist the drill bit 622 in penetrating the surface 606 and subsurface formations 518.

During drilling operations, a mud pump 624 may pump drilling fluid (sometimes known by those of ordinary skill in the art as "drilling mud") from a mud pit 626 through a hose 628 into the drill pipe 614 and down to the drill bit 622. The drilling fluid can flow out from the drill bit 622 and be returned to the surface 606 through an annular area 630 between the drill pipe 614 and the sides of the borehole 512. The drilling fluid may then be returned to the mud pit 626, where such fluid is filtered. In some embodiments, the drilling fluid can be used to cool the drill bit 622, as well as to provide lubrication for the drill bit 622 during drilling operations. Additionally, the drilling fluid may be used to remove subsurface formation cuttings created by operating the drill bit 622.

The workstation 522 and the controller 526 may include modules comprising hardware circuitry, a processor, and/or memory circuits that may store software program modules and objects, and/or firmware, and combinations thereof, as desired by the architect of the gamma-ray spectrometer calibration system 516, 618 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

In some embodiments, a method comprises scanning one or more channels of a pulse-height spectrum within a correlation window; determining a plurality of correlation coefficients based on a comparison of the pulse-height spectrum with an array of values; locating at least one photopeak in an energy spectrum measured by a gamma-ray spectrometer based on one or more of the plurality of correlation coefficients; and calibrating the gamma-ray spectrometer based on a location of at least one photopeak.

In some embodiments, the array of values comprises a substantially symmetrical distribution of values about a maximum amplitude value as a central value.

In some embodiments, the array of values comprises Gaussian function evaluations that span a plurality of pulse-height channels.

In some embodiments, the array of values comprises an odd number of values.

In some embodiments, a method comprises identifying a selected correlation coefficient of the plurality of correlation coefficients.

In some embodiments, locating at least one photopeak comprises identifying a channel associated with the selected correlation coefficient as a photopeak location.

In some embodiments, locating at least one photopeak comprises performing a quadratic interpolation.

In some embodiments, a system comprises a gamma-ray spectrometer; and a processor to compute a plurality of correlation coefficients based on a comparison of a pulse-height spectrum of the gamma-ray spectrometer with an array of values; and locate one or more photopeaks of the pulse-height spectrum based on at least one of the plurality of correlation coefficients.

In some embodiments, a system further comprises a housing attached to the processor.

In some embodiments, a system further comprises a laser to provide one or more reference signals to the gamma-ray spectrometer, wherein the one or more reference signals create the one or more photopeaks.

In some embodiments, the processor is to access instructions which, when executed, operate to locate the one or more photopeaks using polynomial functions.

In some embodiments, the instructions, when executed by the processor, result in performing a quadratic interpolation using one or more of the plurality of correlation coefficients.

In some embodiments, the array of values comprises an array of Gaussian function evaluations.

In some embodiments, a method comprises performing a correlation evaluation of a pulse-height spectrum generated by a gamma-ray spectrometer to produce a plurality of correlation coefficients; identifying a selected correlation coefficient value of the plurality of correlation coefficients; determining a location of at least one photopeak of the pulse-height spectrum based on a value of the selected correlation coefficient; and calibrating a gamma-ray spectrometer based on the location of the at least one photopeak.

In some embodiments, performing the correlation evaluation comprises comparing the pulse-height spectrum with an array of values indicative of a peak shape function.

In some embodiments, the peak shape function is a Gaussian function.

In some embodiments, a method further comprises scanning the plurality of correlation coefficients within a correlation window to obtain the selected correlation coefficient corresponding to the location of the at least one photopeak.

In some embodiments, a method further comprises identifying a channel associated with the selected correlation coefficient value as a beginning channel or an ending channel of the correlation window, wherein determining a location of the at least one photopeak comprises assigning a peak location to the channel associated with the selected correlation coefficient value.

In some embodiments, a method further comprises identifying a channel associated with the selected correlation value as being an intermediate channel located between a beginning channel and an ending channel of the correlation window, wherein determining a location of the at least one photopeak comprises performing a quadratic interpolation.

In some embodiments, the quadratic interpolation comprises a three-point quadratic interpolation performed using adjacent integral channel correlation coefficients.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   positioning a well logging tool along a wellbore, the well logging tool including a gamma-ray spectrometer and a gamma-ray spectrometer calibration system,
   wherein the spectrometer calibration system includes a closed control loop comprising a stabilization multichannel analyzer, a stabilization processor, a current driver, at least one temperature sensor, and a preamplifier;
   directing output pulses from a photomultiplier tube through the preamplifier to the stabilization multichannel analyzer;
   scanning one or more channels of a pulse-height spectrum within a correlation window;
   determining a plurality of correlation coefficients based on a comparison of the pulse-height spectrum with an array of values;
   locating at least one photopeak in an energy spectrum measured by a gamma-ray spectrometer based on one or more of the plurality of correlation coefficients; and
   calibrating the gamma-ray spectrometer based on a location of at least one photopeak, wherein the calibrating comprises adjusting a voltage input to a photomultiplier and a laser.

2. The method of claim 1, wherein the array of values comprises a substantially symmetrical distribution of values about a maximum amplitude value as a central value.

3. The method of claim 1, wherein the array of values comprises Gaussian function evaluations that span a plurality of pulse-height channels.

4. The method of claim 1, wherein the laser generates the at least one photopeak, which is outside a spectra of gamma rays detected by the gamma-ray spectrometer.

5. The method of claim 1, further comprising:
identifying a selected correlation coefficient of the plurality of correlation coefficients.

6. The method of claim 5, wherein locating at least one photopeak comprises identifying a channel associated with the selected correlation coefficient as a photopeak location.

7. The method of claim 5, wherein locating at least one photopeak comprises performing a quadratic interpolation.

8. A system, comprising:
a well logging tool along a wellbore, the well logging tool including a gamma-ray spectrometer and a gamma-ray spectrometer calibration system,
wherein the spectrometer calibration system includes a closed control loop comprising a stabilization multichannel analyzer, a stabilization processor, a current driver, at least one temperature sensor, and a preamplifier;
output pulses from a photomultiplier tube through the preamplifier to the stabilization multichannel analyzer; and
a processor to:
compute a plurality of correlation coefficients based on a comparison of a pulse-height spectrum of the gamma-ray spectrometer with an array of values;
locate one or more photopeaks of the pulse-height spectrum based on at least one of the plurality of correlation coefficients; and
adjust an input voltage to a photomultiplier and a laser to calibrate the gamma-ray spectrometer based on the one or more photopeaks.

9. The system of claim 8, further comprising:
a housing attached to the processor.

10. The system of claim 8, wherein the laser provides one or more reference signals to the gamma-ray spectrometer, and wherein the one or more reference signals create the one or more photopeaks.

11. The system of claim 8, wherein the processor is to access instructions which, when executed, operate to locate the one or more photopeaks using polynomial functions.

12. The system of claim 11, wherein the instructions, when executed by the processor, result in performing a quadratic interpolation using one or more of the plurality of correlation coefficients.

13. The system of claim 8, wherein the array of values comprises an array of Gaussian function evaluations.

14. A method, comprising:
positioning a well logging tool along a wellbore, the well logging tool including a gamma-ray spectrometer and a gamma-ray spectrometer calibration system,
wherein the spectrometer calibration system includes a closed control loop comprising a stabilization multichannel analyzer, a stabilization processor, a current driver, at least one temperature sensor, and a preamplifier;
directing output pulses from a photomultiplier tube through the preamplifier to the stabilization multichannel analyzer;
performing a correlation evaluation of a pulse-height spectrum generated by a gamma-ray spectrometer to produce a plurality of correlation coefficients;
identifying a selected correlation coefficient value of the plurality of correlation coefficients;
determining a location of at least one photopeak of the pulse-height spectrum based on a value of the selected correlation coefficient; and
calibrating a gamma-ray spectrometer based on the location of the at least one photopeak, wherein the calibrating comprises adjusting a voltage input to a photomultiplier and a laser.

15. The method of claim 14, wherein performing the correlation evaluation comprises comparing the pulse-height spectrum with an array of values indicative of a peak shape function.

16. The method of claim 14, wherein the laser generates the at least one photopeak, which is outside a spectra of gamma rays detected by the gamma-ray spectrometer.

17. The method of claim 14, further comprising:
scanning the plurality of correlation coefficients within a correlation window to obtain the selected correlation coefficient corresponding to the location of the at least one photopeak.

18. The method of claim 17, further comprising:
identifying a channel associated with the selected correlation coefficient value as a beginning channel or an ending channel of the correlation window, wherein determining a location of the at least one photopeak comprises assigning a peak location to the channel associated with the selected correlation coefficient value.

19. The method of claim 17, further comprising:
identifying a channel associated with the selected correlation value as being an intermediate channel located between a beginning channel and an ending channel of the correlation window, wherein determining a location of the at least one photopeak comprises performing a quadratic interpolation.

20. The method of claim 19, wherein the quadratic interpolation comprises a three-point quadratic interpolation performed using adjacent integral channel correlation coefficients.

* * * * *